(12) United States Patent
Förg et al.

(10) Patent No.: US 12,392,131 B2
(45) Date of Patent: Aug. 19, 2025

(54) SEALING PROFILE AND DRYWALL

(71) Applicant: Hilti Aktiengesellschaft, Schaan (LI)

(72) Inventors: Christian Förg, Buchloe (DE); Manfred Klein, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 86 days.

(21) Appl. No.: 18/042,498

(22) PCT Filed: Aug. 20, 2021

(86) PCT No.: PCT/EP2021/073157
§ 371 (c)(1),
(2) Date: Feb. 22, 2023

(87) PCT Pub. No.: WO2022/043217
PCT Pub. Date: Mar. 3, 2022

(65) Prior Publication Data
US 2023/0323656 A1 Oct. 12, 2023

(30) Foreign Application Priority Data

Aug. 24, 2020 (EP) .................................. 20192382
Mar. 15, 2021 (EP) .................................. 21162520
Mar. 15, 2021 (EP) .................................. 21162522

(51) Int. Cl.
*E04B 1/68* (2006.01)
*B32B 5/18* (2006.01)
(Continued)

(52) U.S. Cl.
CPC ............. *E04B 1/6812* (2013.01); *B32B 5/18* (2013.01); *B32B 27/065* (2013.01);
(Continued)

(58) Field of Classification Search
CPC ........ E04B 1/6812; E04B 1/947; E04B 1/948; B32B 5/18; B32B 27/065; B32B 38/0004; B32B 2266/06; B32B 2581/00
See application file for complete search history.

(56) References Cited

U.S. PATENT DOCUMENTS 4,899,510 A * 2/1990 Propst ..................... E04B 2/825
52/582.2
5,312,672 A * 5/1994 Dittmeier .................. B32B 1/08
428/192

(Continued)

FOREIGN PATENT DOCUMENTS

DE 2149168 4/1973
EP 2354410 8/2011
(Continued)

OTHER PUBLICATIONS

Förg et al., U.S. Appl. No. 18/041,664, filed Feb. 14, 2023.
(Continued)

*Primary Examiner* — Robert Canfield
(74) *Attorney, Agent, or Firm* — Grüneberg and Myers PLLC

(57) ABSTRACT

A sealing profile can be used for an edge joint formed between a floor and adjacent cladding of drywall. The sealing profile has a base body for sealing the edge joint. The base body has an upper portion close to the cladding and an opposite bottom portion. The upper portion has an upper side which forms a support for the cladding. The sealing profile also has a lateral fastening portion running towards the base body for fastening the sealing profile to a lateral holding rail of the drywall. The fastening portion is only firmly connected to the base body via the bottom portion. The base body also has a side surface which is directly opposite the fastening portion and which is not connected to (Continued)

the opposite region of the fastening portion. Drywall can contain such a sealing profile.

16 Claims, 3 Drawing Sheets

(51) Int. Cl.
| | | |
|---|---|---|
| *B32B 27/06* | (2006.01) | |
| *B32B 38/00* | (2006.01) | |
| *E04B 2/74* | (2006.01) | |
| *E04B 1/94* | (2006.01) | |

(52) U.S. Cl.
CPC ........ *B32B 38/0004* (2013.01); *E04B 2/7409* (2013.01); *B32B 2266/06* (2013.01); *B32B 2581/00* (2013.01); *E04B 1/947* (2013.01); *E04B 1/948* (2013.01)

(56) References Cited

U.S. PATENT DOCUMENTS

| | | | |
|---|---|---|---|
| 8,640,415 B2 | 2/2014 | Pilz et al. | |
| 8,793,947 B2 | 8/2014 | Pilz et al. | |
| 9,290,932 B2 | 3/2016 | Pilz et al. | |
| 9,683,364 B2 | 6/2017 | Pilz et al. | |
| 10,184,246 B2 | 1/2019 | Pilz et al. | |
| 10,267,036 B2 | 4/2019 | Kleinhans et al. | |
| 10,774,528 B2 | 9/2020 | Kleinhans et al. | |
| 11,060,283 B2 | 7/2021 | Pilz et al. | |
| 11,905,705 B2 | 2/2024 | Pilz et al. | |
| 2009/0229215 A1* | 9/2009 | Hopkins | E04F 15/14 52/746.1 |
| 2016/0017598 A1* | 1/2016 | Klein | E04B 2/7411 52/232 |
| 2016/0201319 A1* | 7/2016 | Pilz | E04B 2/7411 52/232 |
| 2016/0208484 A1* | 7/2016 | Pilz | E04B 2/7411 |
| 2018/0002917 A1 | 1/2018 | Kleinhans et al. | |
| 2019/0203464 A1 | 7/2019 | Kleinhans et al. | |
| 2020/0199867 A1* | 6/2020 | Ackerman | E04B 1/947 |
| 2020/0199869 A1* | 6/2020 | Simonic | E04B 2/7411 |
| 2020/0240140 A1* | 7/2020 | Pilz | E04B 2/7457 |
| 2023/0304280 A1* | 9/2023 | Förg | E04B 2/7411 |
| 2023/0323656 A1* | 10/2023 | Förg | E04B 1/6813 52/396.06 |
| 2023/0323657 A1* | 10/2023 | Förg | E04B 1/947 52/232 |
| 2023/0332398 A1* | 10/2023 | F?rg | F16J 15/104 |
| 2024/0263440 A1* | 8/2024 | Förg | E04B 2/7457 |
| 2024/0263441 A1* | 8/2024 | Pilz | E04B 1/948 |
| 2024/0263444 A1 | 8/2024 | Pilz et al. | |

FOREIGN PATENT DOCUMENTS

| | | | | |
|---|---|---|---|---|
| GB | 2105762 A | * | 3/1983 | ............ E04B 2/825 |
| WO | 2016/128552 | | 8/2016 | |

OTHER PUBLICATIONS

Förg et al., U.S. Appl. No. 18/041,675, filed Feb. 14, 2023.
Förg et al., U.S. Appl. No. 18/042,467, filed Feb. 22, 2023.
Förg et al., U.S. Appl. No. 18/042,480, filed Feb. 22, 2023.
Förg et al., U.S. Appl. No. 18/042,634, filed Feb. 23, 2023.
Förg et al., U.S. Appl. No. 18/042,767, filed Feb. 23, 2023.
U.S. Appl. No. 18/041,664, filed Feb. 14, 2023, Förg et al.
U.S. Appl. No. 18/041,675, filed Feb. 14, 2023, Förg et al.
U.S. Appl. No. 18/042,634, filed Feb. 23, 2023, Förg et al.
U.S. Appl. No. 18/042,767, filed Feb. 23, 2023, Förg et al.
U.S. Appl. No. 18/042,480, filed Feb. 22, 2023, Förg et al.
U.S. Appl. No. 18/042,467, filed Feb. 22, 2023, Förg et al.
International Search Report dated Nov. 23, 2021, in PCT/EP2021/073157, with English translation 5 pages.
Written Opinion dated Nov. 23, 2021, in PCT/EP2021/073157, with English translation 10 pages.
Hilti, "Bottom Track Seal CFS-BTS", Product Information, CFS-BTS 5/8" and CFS-BTS 1-1/4", Sep. 2023, 1 page.
Cemco®, "Hotrod® BW Compressible Firestop", Product Description, Feb. 11, 2025, 2 pages.
Cemco®, "Smoke & Sound Stop Blue (SSSB)", Product Description, Feb. 11, 2025, 2 pages.
"XHBN—Joint Systems: XHBN7—Joint Systems Certified for Canada", System No. BW-S-0024, UL Product IQ®, Sep. 6, 2024, 4 pages.
Blaze Foam, Intumescent compressible Firestop Foam, For Head of Wall Applications—Dynamic & Static, Blazing Fast Firestop Installation, RectorSeal, 2018, 2 pages.

* cited by examiner

SEALING PROFILE AND DRYWALL

CROSS-REFERENCE TO RELATED APPLICATIONS

This application is the National Stage entry under § 371 of International Application No. PCT/EP2021/073157, filed on Aug. 20, 2021, and which claims the benefit of priority to European Application No. 20192382.8, filed on Aug. 24, 2020, priority to European Application Ser. No. 21/162, 522.3, filed on Mar. 15, 2021, and priority to European Application No. 21162520.7, filed on Mar. 15, 2021. The content of each of these applications is hereby incorporated by reference in its entirety.

BACKGROUND OF THE INVENTION

Field of the Invention

The invention relates to a sealing profile for an edge joint, which edge joint is formed between a floor and adjacent cladding of drywall. The invention also relates to drywall having such a sealing profile.

Description of Related Art

Edge joints, in particular floor joints, are designed to provide sound decoupling of the drywall from adjacent walls, ceilings, or floors, in particular floorings.

The wall surfaces of the drywall are formed by cladding parts such as gypsum boards, which often have to be protected from moisture. The edge joints therefore also form a barrier that protects the cladding parts against rising moisture, for example in the event of a pipe burst.

The edge joints are usually sprayed with a sealing compound in order to provide a sound and fire protection function and to seal the joint against air and odors.

Sealing compounds have the disadvantage that the application is time-consuming and not very ergonomic. Furthermore, sealing compounds can usually only be used reliably at temperatures of at least 5° C. and the substrate must be dry. The inspection is not easy either, since, for example, the installation depth cannot be checked non-destructively.

SUMMARY OF THE INVENTION

The object of the invention is to provide a sealing profile for an edge joint of drywall, which ensures easy assembly of the sealing profile and effective sealing of the edge joint.

To achieve the object, a sealing profile for an edge joint is provided, which edge joint is formed between a floor and adjacent cladding of drywall. The sealing profile comprises a base body for sealing the edge joint, the base body having an upper portion close to the cladding, the upper portion having an upper side which forms a support for the cladding, and the base body having an opposite bottom portion, and the sealing profile comprises a lateral fastening portion running towards the base body for fastening the sealing profile to a lateral holding rail of the drywall, which fastening portion is only firmly connected to the base body via the bottom portion. The base body has a side surface which is directly opposite the fastening portion and which is not connected to the opposite region of the fastening portion. In the scope of the invention, the lateral holding rail is a holding rail of the drywall that runs on the floor and runs laterally to the sealing profile or adjacent to the edge joint.

It was recognized according to the invention that edge joints with different joint widths can be sealed particularly reliably with a sealing profile configured in this way. In particular in the case of a top-down installation, i.e. an installation of the drywall in which the cladding is assembled in a plurality of parts from the ceiling downwards to the floor, the joint width of the floor joints can deviate significantly from a specified standard value. Since the upper portion of the base body is not fastened laterally to the fastening portion or is firmly connected thereto, the upper portion can be resiliently deformed or compressed particularly strongly in the vertical direction. As a result, in the installed state, the sealing profile adapts to the joint width of the edge joint over a particularly large vertical region and thus seals it off effectively. The fastening portion also ensures a defined and reliable fastening of the sealing profile to the holding rail, so that assembly can be carried out with little effort.

It can be provided in this case that the upper portion is firmly connected exclusively to the bottom portion. Because of this design, the other sides of the upper portion are free, i.e. not fastened to another portion of the sealing profile, as a result of which the upper portion can be resiliently deformed vertically with particularly little resistance. In particular, the upper portion is not significantly hindered by laterally adjacent portions.

DETAILED DESCRIPTION OF THE INVENTION

Figure 1:
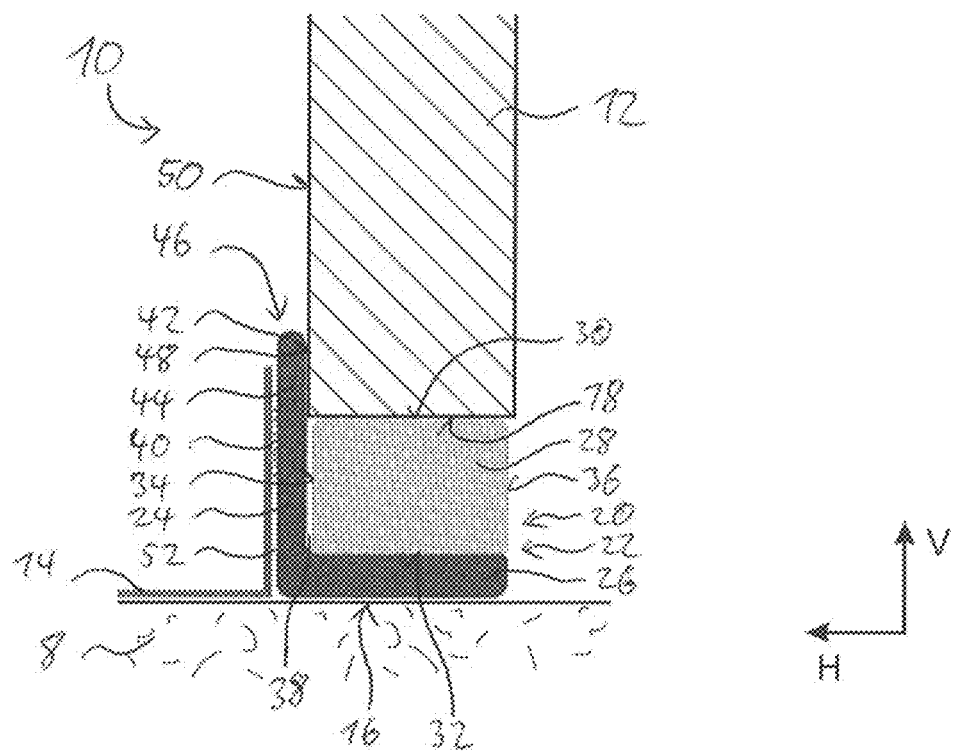
FIG. 1 is a schematic sectional view of drywall according to the invention having a sealing profile according to the invention in the assembled state.

According to one embodiment, the fastening portion forms a sealing web which, in the assembled state, is a lateral contact surface for the cladding and is configured to seal a gap between the holding rail of the drywall and the cladding. In this way, the sealing profile provides a particularly effective seal for the edge joint. The sealing web separates the cladding from the narrow space that is formed between the holding rail and the fastening portion in the assembled state, so that the cladding is reliably protected against moisture, even if it should rise in the intermediate space due to the capillary effect.

It can be provided in this case that the sealing web extends vertically beyond the level of the upper side of the upper portion in the unassembled and unloaded state. The sealing web is thus designed particularly long in the vertical direction and ensures that the cladding is reliably protected from moisture rising in the intermediate space despite the capillary effect.

In an alternative embodiment, the sealing web ends at the height of the upper side of the upper portion in the unassembled and unloaded state. Thus, the sealing web ends flush with the upper side of the upper portion and forms a planar side of the sealing profile in combination therewith. This design offers advantages in further processing and packaging of the sealing profile as well as in logistics.

According to a further embodiment, the base body or the upper portion is a hollow profile with at least one cavity. In this way, the base body can be designed to be particularly flexible, so that the sealing profile adapts effectively to different joint widths.

The sealing profile can have a fastening element attached to the fastening portion, as a result of which assembly is further simplified.

In one embodiment, the bottom portion is formed in one piece with the upper portion. Because of this integral design, the base body can be produced with little effort and particularly reliably ensures effective sealing of the edge joint.

Furthermore, it can be provided that the bottom portion merges in one piece into the fastening portion, so that these two portions can be designed in a particularly defined and stable manner with respect to one another.

In a further embodiment, the fastening portion and the base body are designed as a whole in one piece. In particular, the upper portion is separated from the fastening portion by an incision or gap. In this way, the sealing profile can be produced particularly efficiently.

In an alternative embodiment, the fastening portion is formed from a different material than the upper portion and/or the bottom portion, as a result of which the portions can be configured according to different requirements, in particular with regard to strength and elasticity.

In this case, the fastening portion can be designed in one piece together with the bottom portion and can form an L-shaped cross section in combination therewith. Furthermore, the upper portion is fastened to the bottom portion. Due to the L-shaped cross section, the fastening portion forms an angle with the bottom portion which reliably ensures a defined alignment of the sealing profile in the edge joint.

Furthermore, the upper portion can be separated from the fastening portion by a gap. In this case, the gap provides space into which the upper portion can expand during deformation and thus adapt more effectively to the joint width of the edge joint.

According to one embodiment, the upper portion is formed from an open-cell foam that is particularly flexible.

Additionally or alternatively, the bottom portion and/or the fastening portion can be formed from a plastics material or a closed-cell foam in order to provide a high level of strength and/or resistance.

According to the invention, drywall having a sealing profile according to the invention, a holding rail, and cladding, which forms a wall surface of the drywall, is also provided in order to achieve the above-mentioned object. The cladding rests with its circumferential side against the support of the upper portion.

Figure 2:
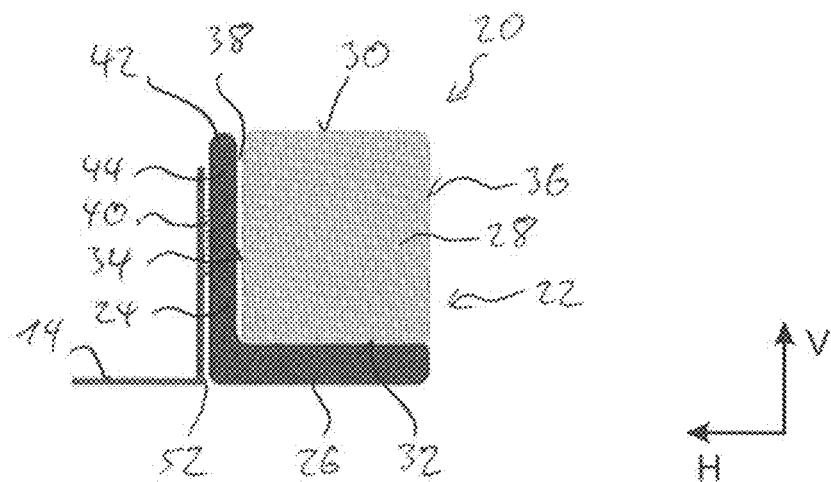
FIG. 2 is a schematic sectional view of the sealing profile from FIG. 1 in the unassembled state.
Figure 3:
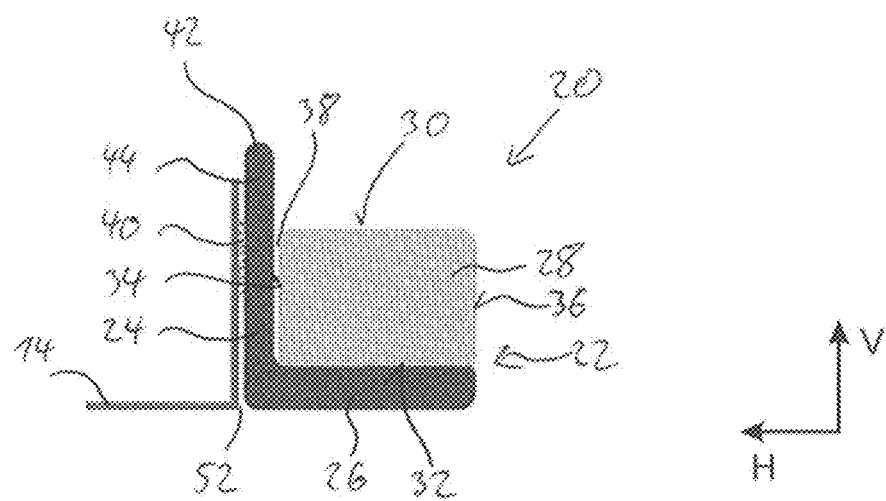
FIG. 3 is a schematic sectional view of a further embodiment of a sealing profile according to the invention in an unassembled state.
Figure 4:
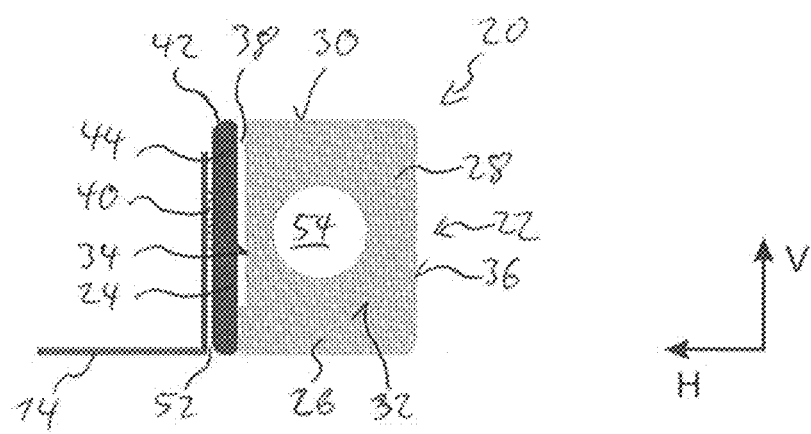
FIG. 4 is a schematic sectional view of a further embodiment of a sealing profile according to the invention in an unassembled state.
Figure 5:
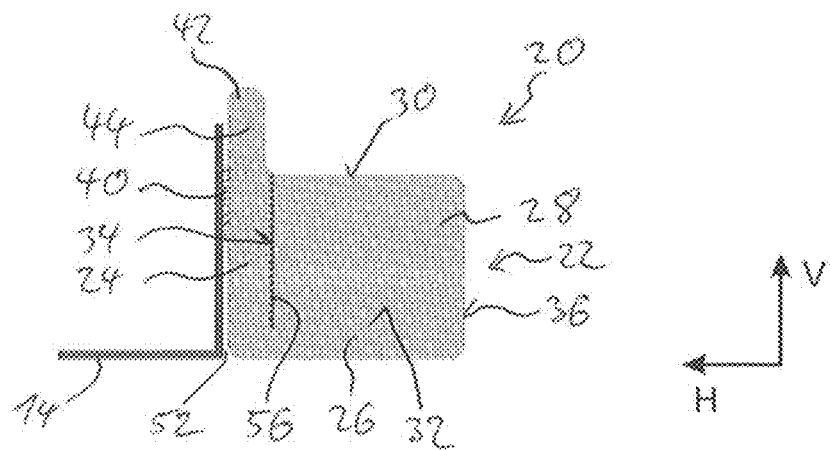
FIG. 5 is a schematic sectional view of a further embodiment of a sealing profile according to the invention in an unassembled state.
Figure 6:
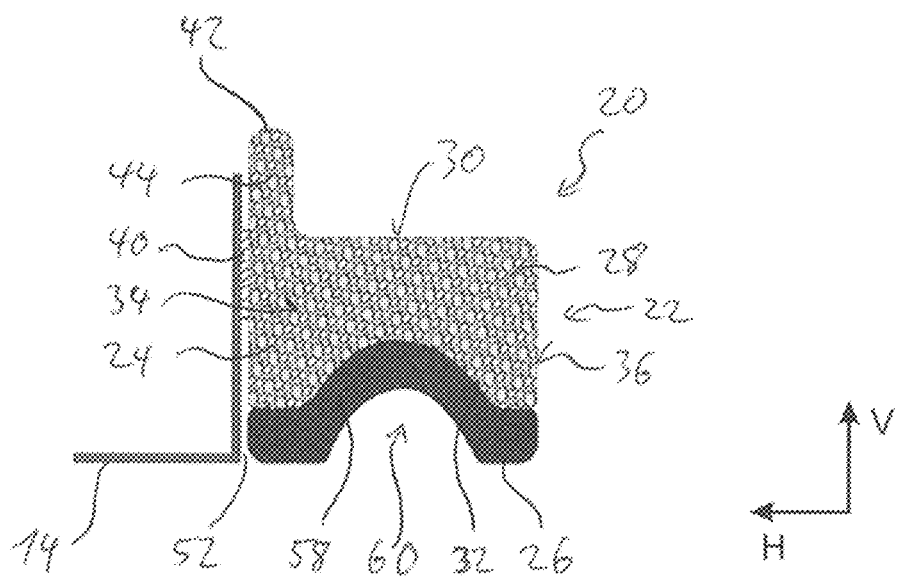
FIG. 6 is a schematic sectional view of a further embodiment of a sealing profile according to the invention in an unassembled state.
Figure 7:
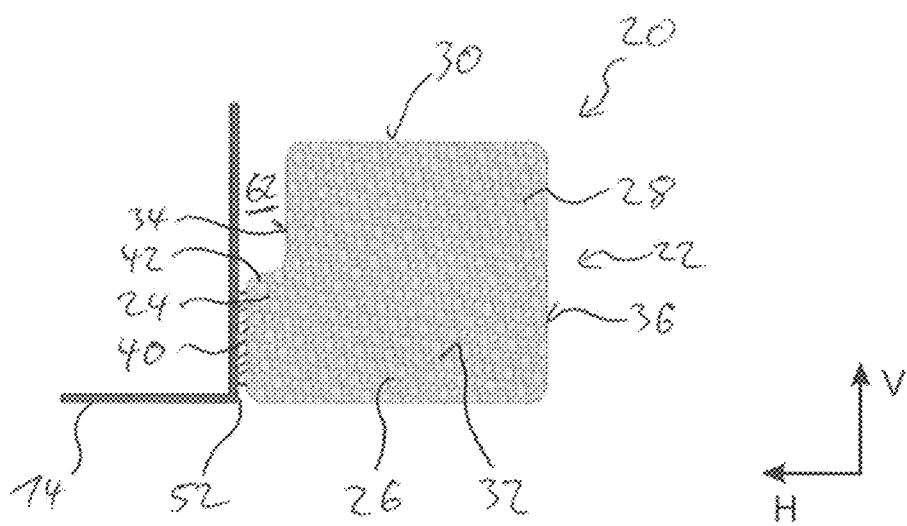
FIG. 7 is a schematic sectional view of a further embodiment of a sealing profile according to the invention in an unassembled state.

Further advantages and features emerge from the following description and from the accompanying drawings. In the drawings:

FIG. 1 is a schematic sectional view of drywall according to the invention having a sealing profile according to the invention in the assembled state, FIG. 2 is a schematic sectional view of the sealing profile from FIG. 1 in the unassembled state, FIG. 3 to 5 are in each case a schematic sectional view of further embodiments of sealing profiles according to the invention in the unassembled state, and FIGS. 6 and 7 are in each case a schematic sectional view of further embodiments of sealing profiles in the unassembled state, which represent an invention of their own.

FIG. 1 is a cross section of drywall 10 with cladding 12 (gypsum wall) and a holding rail 14, which is part of a stand construction of the drywall 10.

In the present case, the holding rail 14 is a floor profile that is firmly anchored on the floor 8, for example by means of dowels.

The cladding 12 is attached to the stand construction at a distance from the floor 8, as a result of which an edge joint 16 in the form of a floor joint is formed between a circumferential side 18 of the cladding 12 and the floor 8.

In order to seal the edge joint 16, the drywall 10 also has a sealing profile 20, the structure of which is described below with reference to FIGS. 1 and 2. FIG. 1 shows the sealing profile 20 in the assembled state, when the cladding 12 rests against the sealing profile 20 or compresses it in the vertical direction V, while FIG. 2 shows the sealing profile 20 in the unassembled and unloaded state.

The sealing profile 20 has a base body 22, which forms a sealing portion between the circumferential side 18 of the cladding 12 and the floor 8, and a fastening portion 24, which is arranged between the base body 22 and the holding rail 14.

The base body 22 has a bottom portion 26 facing the floor 8 and an upper portion 28 facing the cladding 12.

The upper portion 28 has an upper side 30 arranged opposite to the base portion 26, against which upper side the cladding 12 rests in the assembled state with the circumferential side 18, an underside 32 facing the bottom portion 26, via which underside the upper portion 28 is firmly connected to the bottom portion 26, a side surface 34 opposite to the fastening portion 24, and an outer side 36 opposite to the side surface 34.

In the embodiment shown, the side surface 34 is separated from the fastening portion 24 by a vertical gap 38.

In an alternative embodiment, the upper portion 28 can rest against the fastening portion 24.

However, in all of the embodiments, the side surface 34 is separated from the region of the fastening portion 24 opposite thereto or is not firmly connected thereto.

In this case, the side surface 34 extends over the entire vertical height of the upper portion and over more than 80% of the vertical height of the base body 22.

In principle, the side surface 34 can extend over any proportion of the vertical height of the base body 22, in particular over more than 50%.

The bottom portion 26 extends in the horizontal direction H up to the fastening portion 24 and over the entire underside 32 of the upper portion 28, so that the upper portion 28 is fastened exclusively over its underside 32 and only on the bottom portion 26. Thus, the upper side 30, the side surface 34 and the outer side 36 are free, i.e. not firmly connected to any other part of the sealing profile 20.

In the embodiment shown, the fastening portion 24 is formed in one piece with the bottom portion 26 to form an L-shaped profile.

The fastening portion 24 and the bottom portion 26 consist of a plastics material, for example EPDM, PVC, foam rubber, thermoplastic elastomer, or silicone.

In an alternative embodiment, the fastening portion 24 and/or the bottom portion 26 can be formed from a closed-cell foam.

The upper portion 28 consists of an open-cell foam, for example a foam based on PE, XPE, or EPDM.

In one embodiment, the sealing profile 20 is an extruded profile which is produced by means of 2-component extrusion.

Of course, the fastening portion 24, the bottom portion 26, and the upper portion 28 can each be formed from any desired material.

In principle, the bottom portion 26 can be formed in one piece with the fastening portion 24 and/or the upper portion 28.

To fasten the sealing profile 20 to the holding rail 14, the sealing profile 20 has a fastening element 40 which is attached to the fastening portion 24 on the side opposite the base body 22.

The fastening element 40 is, for example, a double-sided adhesive tape with masking paper, which protects the adhesive strip of the adhesive tape until assembly and is peeled off before assembly.

The base body 22 is thus fastened to the holding rail 14 via the fastening portion 24.

The fastening portion 24 extends in the vertical direction V as far as an end 42 facing away from the floor, which in the unassembled state (see FIG. 2) ends at the same vertical height as the upper side 30 of the upper portion 28.

In the assembled state (see FIG. 1), the fastening portion 24 forms a sealing web 44 which extends in the vertical direction V into a gap 46 that is formed between the holding rail 14 and the edge 48 of the inner end face 50 of the cladding 12 adjacent to the circumferential side 18.

The cladding 12 rests against the sealing web 44 via its edge 48, whereby the gap 46 is sealed.

Furthermore, the sealing web 44 protects the cladding 12 from moisture that could rise in the intermediate space 52 between the fastening portion 24 and the holding rail 14 due to capillary effects when the floor 8 is covered with a film of water, for example.

In order to reliably seal the edge joint 16 having the sealing profile 20, during the assembly of the drywall 10, the sealing profile 20 is fastened to the holding rail 14 by means of the fastening element 40, which is preferably anchored to the floor 8 before this step.

The sealing profile 20 is designed in such a way that it does not hinder the assembly of vertical uprights of the stand construction of the drywall 10. This means that the vertical uprights can optionally also be installed after the sealing profile 20 has been attached to the holding rail 14. In general, however, the sealing profile 20 is attached to the holding rail after fastening the vertical uprights.

The cladding 12 is now set up with its circumferential side 18 on the upper side 30 of the upper portion 28 so that the edge 48 of the end face 50 rests against the sealing web 44 and the base body 22 is pressed against the floor 8 and then fastened to the stand construction.

Optionally, before it is fastened to the stand construction, the cladding 12 can be raised using a lever, also known as a "kicker," which is attached between the floor 8 and the bottom portion 26 of the sealing profile 20.

In this way, the cladding 12 is raised together with the base body 22, so that the cladding 12 can be fastened at an intended height, in particular in the case of a top-down assembly of the drywall 10.

The bottom portion 26 forms the point of contact for the lever and is preferably designed to be correspondingly robust in order to protect the comparatively soft upper portion 28.

Because the upper portion 28 is not fastened to the side surface 34 and the outer side 36, the upper portion 28 can be resiliently deformed particularly well in the vertical direction V, as a result of which its vertical height can vary over a particularly large range, depending on the load.

In this way, the sealing profile 20 reliably seals the edge joint 16 as long as the joint width is provided within the comparatively wide range for which the sealing profile 20 is intended.

The region for which the sealing profile 20 is provided is in particular ¼" (0.635 cm) to ¾" (1.905 cm). This means that the base body 22 is configured to reliably seal joint widths of ¼" (0.635 cm) to ¾" (1.905 cm) and for this purpose has a vertical height of at least 2 cm, for example.

Since the cladding 12 is placed on the sealing profile 20 during assembly, the weight of the cladding 12 also ensures that the base body 22 rests sealingly against the floor 8.

Thus, edge joints 16 can be sealed particularly effectively by means of the sealing profile 20, even if the joint width is not limited to a small region, as is the case, for example, in a top-down assembly.

A sealing profile 20 according to a further embodiment will now be described with reference to FIG. 3. The same reference signs are used for the components which are known from the above embodiment and in this respect reference is made to the preceding explanations.

In contrast to the embodiment shown in FIG. 2, the sealing web 44 extends in the unloaded state of the sealing profile 20 in the vertical direction V beyond the upper side 30 of the upper portion 28. In other words, the end 42 terminates at a vertical height that is above the upper side 30 of the upper portion 28.

A sealing profile 20 according to a further embodiment will now be described with reference to FIG. 4. The same reference signs are used for the components which are known from the above embodiment and in this respect reference is made to the preceding explanations.

In contrast to the embodiment shown in FIG. 2, the bottom portion 26 is formed in one piece with the upper portion 28 instead of the fastening portion 24 and accordingly consists of the same material as the upper portion 28.

The base body 22 is attached to the fastening portion 24 via the bottom portion 26, for example by molding on or by means of an adhesive connection.

Furthermore, in this embodiment, the base body 22 is designed as a hollow profile having a cavity 54, as a result of which the sealing profile 20 can be produced in a material-efficient manner and the base body 22 is particularly flexible.

The cavity 54 is arranged in the upper portion 28.

Of course, in an alternative embodiment, the cavity 54 can additionally or alternatively be arranged in the bottom portion 26.

Furthermore, the base body 22 can be a hollow profile with a plurality of cavities 54.

A sealing profile 20 according to a further embodiment will now be described with reference to FIG. 5. The same reference signs are used for the components which are known from the above embodiment and in this respect reference is made to the preceding explanations.

In contrast to the embodiment shown in FIG. 3, the bottom portion 26 is designed in one piece with both the upper portion 28 and the fastening portion 24.

In this case, the fastening portion 24 and the bottom portion 26 are made of the same material as the upper portion 28.

Furthermore, the sealing profile 20 does not have a vertical gap 38 between the upper portion 28 and the fastening portion 24, but rather the upper portion 28 is separated from the fastening portion 24 by a vertical incision 56. Thus, although the side surface 34 rests against the fastening portion 24, the upper portion 28 and the fastening portion 24 are not directly firmly connected to one another so that the upper portion 28 can be deformed in the vertical direction independently of the fastening portion 24.

This embodiment has the advantage that the sealing profile 20 can be produced with particularly little effort.

A sealing profile 20 according to a further embodiment will now be described with reference to FIG. 6. The same reference signs are used for the components which are known from the above embodiment and in this respect reference is made to the preceding explanations.

In contrast to the embodiment shown in FIG. 3, the fastening portion 24 is formed in one piece with the upper portion 28 instead of the bottom portion 26 and accordingly consists of the same material as the upper portion 28. The embodiment can optionally also be provided with a vertical gap 38 (not shown in FIG. 6).

The bottom portion 26 also has a cross section having an arched portion 58 which arches towards the upper portion 28 and thus forms a bottom-side channel 60 which provides a defined point of contact for a lever during assembly.

In an alternative embodiment, the upper portion 28, analogously to the embodiment shown in FIG. 5, can be separated from the fastening portion 24 at least in portions by a vertical incision 56.

A sealing profile 20 according to a further embodiment will now be described with reference to FIG. 7. The same reference signs are used for the components which are known from the above embodiment and in this respect reference is made to the preceding explanations.

In contrast to the embodiment shown in FIG. 5, the fastening portion 24 does not extend in the vertical direction V up to the height of the upper side 30 of the upper portion 28 or beyond, but ends at approximately half the height of the base body 22.

Thus, instead of a sealing web 44, the sealing profile 20 has a recess 62 through which the sealing profile 20 has a stepped profile on the holding rail side or on the fastening side. In other words, the fastening portion 24 forms an extension on the holding rail side, which extends away from the base body 22, in particular from the bottom portion 26, in the horizontal direction H and away at the bottom.

In the assembled state, the intermediate space 52 is formed wider at the vertical height of the recess 62 in the horizontal direction than at the height of the fastening portion 24, so that the capillary effect is significantly reduced at the height of the recess 62. In this way, the cladding 12 is reliably protected from moisture that rises in the intermediate space 52.

In an alternative embodiment, the upper portion 28, analogously to the embodiment shown in FIG. 5, can be separated from the fastening portion 24 at least in portions by a vertical incision 56.

The invention is not limited to the embodiments shown. In particular, individual features of one embodiment can be combined in any way with features of other embodiments, in particular independently of the other features of the corresponding embodiments.

The invention claimed is:

1. A sealing profile for an edge joint formed between a floor and adjacent cladding of drywall, the sealing profile comprising:
    a base body for sealing the edge joint, the base body having
       an upper portion having an upper
       side which forms a support for the cladding, and
       an opposite bottom portion, and
    a lateral fastening portion that fastens the sealing profile to a lateral holding rail of the drywall, wherein the fastening portion is only connected to the base body via the bottom portion,
    wherein the base body has a side surface which is directly opposite the fastening portion and which is not connected to an opposite region of the fastening portion.

2. The sealing profile according to claim 1, wherein the upper portion is connected exclusively to the bottom portion.

3. The sealing profile according to claim 1, wherein the fastening portion forms a sealing web which is a lateral contact surface for the cladding and is configured to seal a gap between the holding rail of the drywall and the cladding.

4. The sealing profile according to claim 3, wherein the sealing web extends vertically beyond a level of the upper side of the upper portion in an unassembled and unloaded state.

5. The sealing profile according to claim 3, wherein the sealing web ends at a height of the upper side of the upper portion in an unassembled and unloaded state.

6. The sealing profile according to claim 1, wherein the base body or the upper portion is a hollow profile having at least one cavity.

7. The sealing profile according to claim 1, wherein the sealing profile has a fastening element attached to the fastening portion.

8. The sealing profile according to claim 1, wherein the bottom portion is formed in one piece with the upper portion.

9. The sealing profile according to claim 1, wherein the bottom portion merges in one piece into the fastening portion.

10. The sealing profile according to claim 1, wherein the fastening portion and the base body are entirely in one piece.

11. The sealing profile according to claim 10, wherein the upper portion is separated from the fastening portion by an incision or a gap.

12. The sealing profile according to claim 1, wherein the fastening portion is formed from a different material than the upper portion and/or the bottom portion.

13. The sealing profile according to claim 12, wherein the fastening portion is formed in one piece together with the bottom portion and forms an L-shaped cross section in combination therewith, and wherein the upper portion is fastened to the bottom portion.

14. The sealing profile according to either claim 12, wherein the upper portion is separated from the fastening portion by a gap.

15. The sealing profile according to claim 1, wherein the upper portion is formed from an open-cell foam, and/or wherein the bottom portion and/or the fastening portion is/are formed from a plastic material or a closed-cell foam.

16. Drywall, comprising:
the sealing profile according to claim 1,
a holding rail, and
cladding which forms a wall surface of the drywall,
wherein the cladding rests with a circumferential side against the support of the upper portion.

\* \* \* \* \*